US008368919B2

(12) United States Patent
Morales et al.

(10) Patent No.: US 8,368,919 B2
(45) Date of Patent: Feb. 5, 2013

(54) ENHANCEMENTS TO JOB TICKET HANDLING DURING MULTIPLE JOB SUBMISSION

(75) Inventors: Javier A. Morales, Rochester, NY (US); Jonathan A. Goldstein, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 1015 days.

(21) Appl. No.: 11/904,207

(22) Filed: Sep. 26, 2007

(65) Prior Publication Data

US 2009/0080012 A1    Mar. 26, 2009

(51) Int. Cl.
 *G06F 3/12* (2006.01)
(52) U.S. Cl. .................................................. 358/1.15
(58) Field of Classification Search ............... 358/1.15; 400/61, 63
See application file for complete search history.

(56) References Cited

U.S. PATENT DOCUMENTS

| 5,718,520 | A  | * | 2/1998  | MacKay ......................... 400/61 |
| 7,242,487 | B2 | * | 7/2007  | Lucivero et al. .............. 358/1.13 |
| 7,532,357 | B2 | * | 5/2009  | Robinson et al. ............... 358/1.9 |
| 2002/0124027 | A1 | * | 9/2002  | Krueger et al. ................ 707/528 |
| 2005/0157341 | A1 | * | 7/2005  | Levine .......................... 358/1.18 |
| 2007/0236725 | A1 | * | 10/2007 | Harmon et al. .............. 358/1.15 |
| 2008/0130035 | A1 | * | 6/2008  | Smith .......................... 358/1.15 |

* cited by examiner

*Primary Examiner* — Benny Q Tieu
*Assistant Examiner* — Eric A Rust
(74) *Attorney, Agent, or Firm* — Kermit D. Lopez; Luis M. Ortiz; Kevin Soules

(57) ABSTRACT

System and method enhancing Job Ticket handling during multiple job submissions. The system parses through the job tickets associated with all user selected jobs and collect information about specified job parameters and their values. The job ticket options available in all output processing and devices specified and the collected job ticket information can be displayed. The user selected job can be filtered according to the job ticket values selected by the user. The system presents an interactive summary view for the user selected job parameters and values. After the user is satisfied with the job programming of all jobs, which can be reviewed during preprocessing (e.g., within a DFE or automated prepress system) the user can submit the jobs for printing.

13 Claims, 5 Drawing Sheets

ENHANCEMENTS TO JOB TICKET HANDLING DURING MULTIPLE JOB SUBMISSION

TECHNICAL FIELD

Embodiments are generally related to data processing systems and methods. Embodiments are also related to the field of methods for enhancing Job Ticket handling during multiple job submission.

BACKGROUND OF THE INVENTION

Conventionally, job tickets are used to direct an imaging system to produce a designated number of documents in a designated format or style, such as, for example, simplex (single-sided) or duplex (double-sided), and/or with designated image processing procedures applied to the document. Accordingly, a document is created as specified in the job ticket attached to the document.

Setting the various parameters for each job ticket, however, is often a time-consuming task. FIG. 1, labeled as prior art, shows a conventional job ticket that includes only a subset of the various parameters that may be set to achieve a desired print product.

It is generally known that inputting individual job tickets for printers, copiers or imaging devices provides flexibility in page sequencing, copying and/or presentation as well as print type, format, etc. for each individual job submitted. The individual printing, copying or imaging parameters may be varied or manipulated by changing the parameters on any job ticket. The repeated entry of parameters and creation of individual job tickets are time-consuming and subject to wasteful error and inefficiencies.

Accordingly, a job ticket 105, as shown in FIG. 1, for example, can be created by an operator to individually select the parameters desired. The operator typically inputs, for example, the desired paper size, any desired reduction/enlargement percentage, which sides are to be imaged (simple or duplex), and/or one or more image quality parameters such as those shown in the basic parameter box 110. The values for the various implemented parameters can be input to the imaging system via any one of a keyboard, mouse or the touch screen display (not shown).

The operator's input of the values for various parameters, such as those identified in basic parameter box 110 of FIG. 1, is a time consuming task and is subject to operator error, particularly when the operator is unfamiliar with the job ticket process or when numerous different parameters are required to be input to produce the desired document or set of documents from the imaging system.

The concurrent reprinting of multiple documents presents unique challenges if said documents also include unique job ticketing. It is likely that the user wants to review potentially outdated stored job settings before printing jobs. Currently, a user has to review job ticket settings one job at a time when concurrently submitting multiple jobs to print. The process can become tiresome and error prone if the user is printing a large number of jobs.

Therefore, a need exists for a method for proposing a series of enhancements to address the deficiencies in multiple job submission and for presenting aggregated job ticket settings that represent the totality of job ticket variability in the collection of jobs the user intends to reprint. Furthermore, the method should allow filtering and other data manipulation on the collection of jobs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing system and method.

It is another aspect of the present invention to provide for a method for enhancing Job Ticket (JT) handling during multiple job submission.

It is yet another aspect of the present invention to provide for a method of enhancing Job Ticket (JT) handing when reviewing jobs that are queued to print before releasing them, which is possible within systems such as Digital Front Ends (DFEs) and automated prepress systems.

The aforementioned aspects and other objectives and advantages can now be achieved as described herein. The system parse through the job tickets associated with all user selected jobs and collect information about specified job parameters and their values. The job ticket options available in all output devices specified in the collected job ticket information are displayed. Then the user has an option to switch into an "aggregational" operational mode that allows greater interaction with the collection of jobs. In addition to the previous operation mode, the user has the option to bring up an interactive summary view of the selected jobs.

The system presents an interactive summary view for a user selected job parameter. Once the user selects the desired job parameters, the system can present an interactive listing view of the jobs and the values for the specified parameters. If required the user can change the values of the job parameters in the interactive summary view. After the user is satisfied with the job programming of all jobs, the user can submit the jobs for printing. All the print jobs can be submitted to their proper destinations with job parameters as specified by the associated job tickets with any modifications made by the user.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

Figure 1:
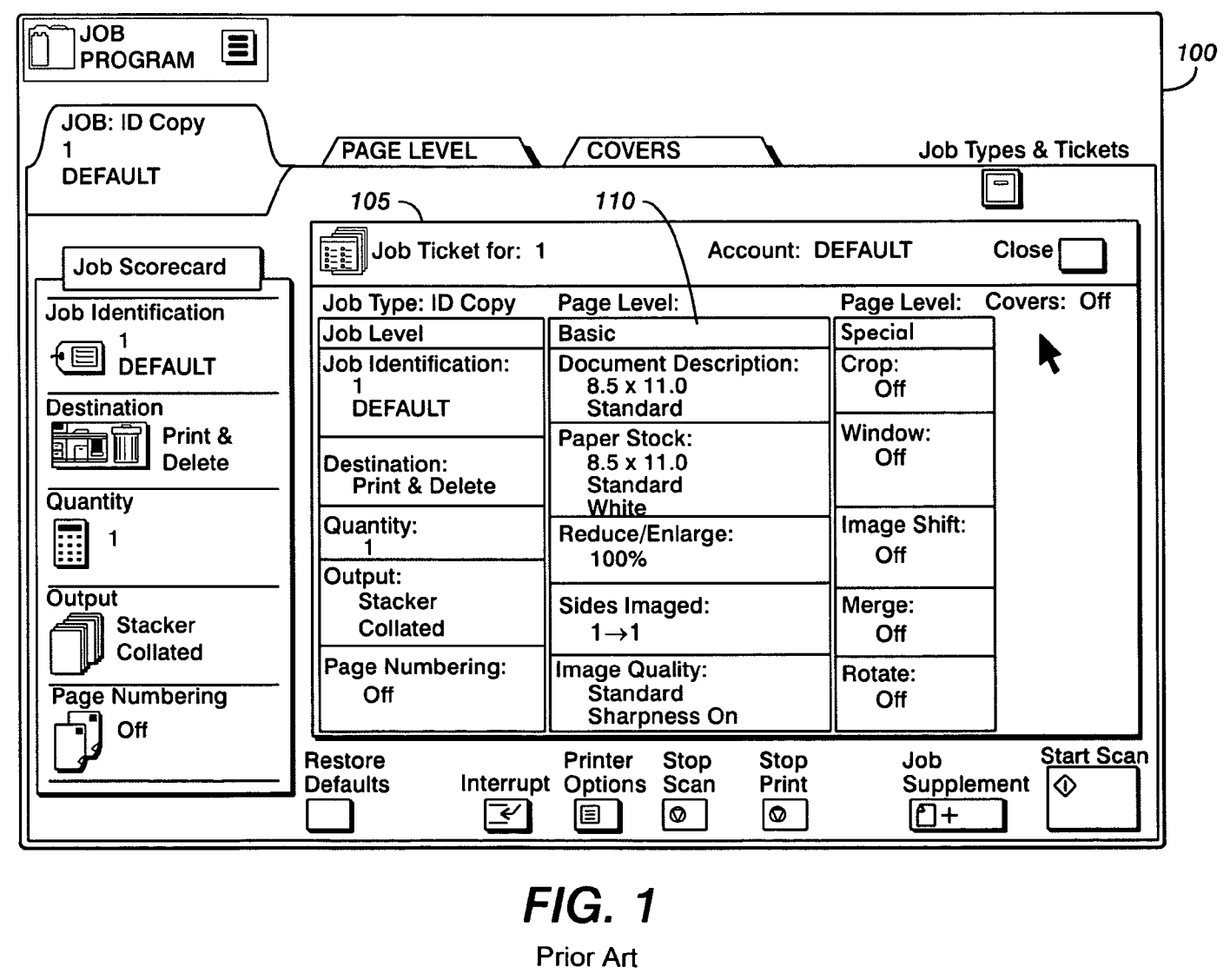

FIG. 1, labeled as "Prior Art", illustrates an explanatory diagram of a conventional job ticket and a subset of various parameters available for setting in a job ticket;

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules can constitute hardware modules, such as, for example, electronic components of a computer system. Such modules can also constitute software modules. In the computer programming arts, a software "module" can be typically implemented as a collection of routines and data structures that performs particular tasks or implements a particular abstract data type.

Figure 2:
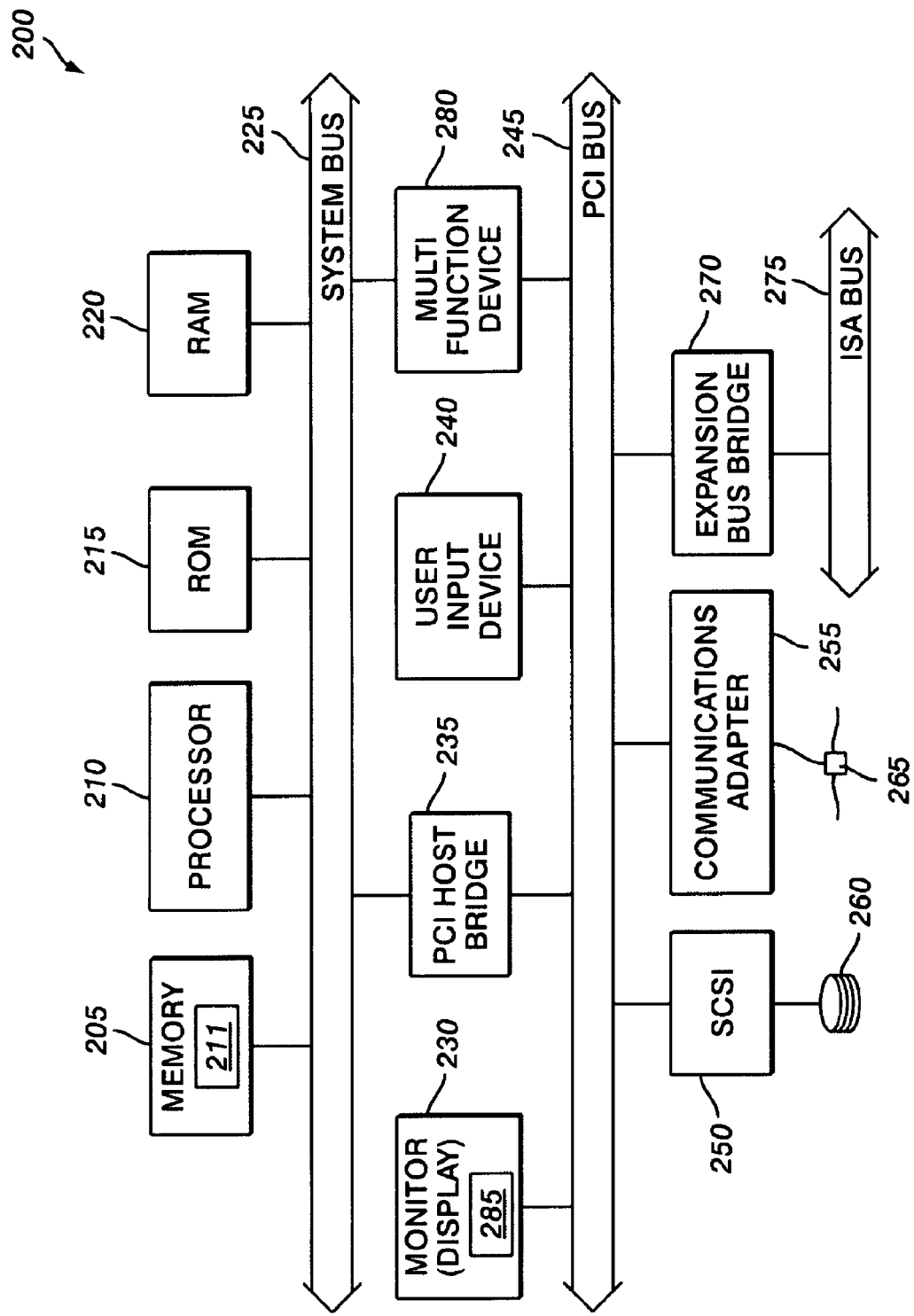
FIG. 2 illustrates a block diagram of a data processing system, which can be implemented in accordance with a preferred embodiment.

Software modules 21, such as that shown in FIG. 2, generally include instruction media storable within a memory location 205 of a data-processing system 200 and are typically composed of two parts. First, a software module 211 can list the constants, data types, variable, routines and the like that can be accessed by other modules or routines. Second, a software module 211 can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 211 depicted in FIG. 2.

It is important to note that, although the embodiments are described in the context of a fully functional data-processing system 200 (e.g., a computer system), those skilled in the art will appreciate that the features of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links. The logical operation steps depicted in FIG. 7 can, for example, be implemented in the context of such a software module.

As shown in FIG. 2, a memory 205, a processor (CPU) 210, a Read-Only memory (ROM) 215, and a Random-Access Memory (RAM) 220 are generally connected to a system bus 225 of system 200. Memory 205 can be implemented as a ROM, RAM, a combination thereof, or simply a general memory unit. Module 211 can be stored within memory 205 and then retrieved and processed via processor 210 to perform a particular task. A user input device 240, such as a keyboard, mouse, or another pointing device, can be connected to PCI (Peripheral Component Interconnect) bus 245. A multi-function device 280, which can combine several core technologies, including image scanning, document printing, and fax signaling, into a single unit, can also be connected to PCI bus 245.

Data-processing system 200 thus includes CPU 210, ROM 215, and RAM 220, which can also be coupled to Peripheral Component Interconnect (PCI) local bus 245 of data-processing system 200 through PCI host-bridge 235. PCI Host Bridge 235 can provide a low latency path through which processor 210 can directly access PCI devices mapped anywhere within bus memory and/or input/output (I/O) address spaces. PCI Host Bridge 235 can also provide a high bandwidth path for allowing PCI devices to directly access RAM 220.

Also attachable to PCI local bus 245 are communications adapter 255, small computer system interface (SCSI) 250, and expansion bus-bridge 270, communications adapter 255 can be utilized for connecting data-processing system 200 to a network 265. SCSI 250 is utilized to control high-speed SCSI disk drive 260. Expansion bus-bridge 270, such as a PCI-to-ISA bus bridge, can be utilized for coupling ISA bus 275 to PCI local bus 245. Note that PCI local bus 245 can further be connected to a monitory 230, which can function as a display (e.g., a video monitor) for displaying data and information for a user and for interactively displaying a graphical user interface (GUI) 285.

Note that the term "GUI" generally refers to a type of environment that represents programs, files, options and so forth by means of graphically displayed icons, menus, and dialog boxes on a computer monitor screen. A user can interact with the GUI 285 to select and activate such options by pointing and clicking with a user input device such as, for example, a pointing device such as a mouse, and/or with a keyboard. A particular item can function in the same manner to the user in all applications because the GUI 285 provides standard software routines (e.g., module 211) to handle these elements and reports the user's actions.

The user can launch the print submission application and select two or more jobs for printing. Once the user has indicated the desired jobs, the system 200 parse through the job tickets associated with all selected jobs and collect information about specified job parameters and their values. The print submission client can be displayed with all job ticket options available in all output devices specified in the collected job ticket information. The available job ticket parameters can reflect all the job ticket parameters available for all the print engine models specified in the job tickets. For example, if the selected jobs include monochrome and color print engines, the displayed job ticket parameters include all job parameters for both types of print engines. The job parameter values can reflect all the options available for all the print engine models specified in the job tickets. For example, if the selected jobs included Xerox Corporation's iGen3 and DC8000 print engines, the Output destination can include DC8000-unique values such as Stacker 1 and Stacker 2. Aside from the display of a superset of parameters, Job-unique job ticket parameter values are honored as long as the user does not override them during print submission.

Figure 3:
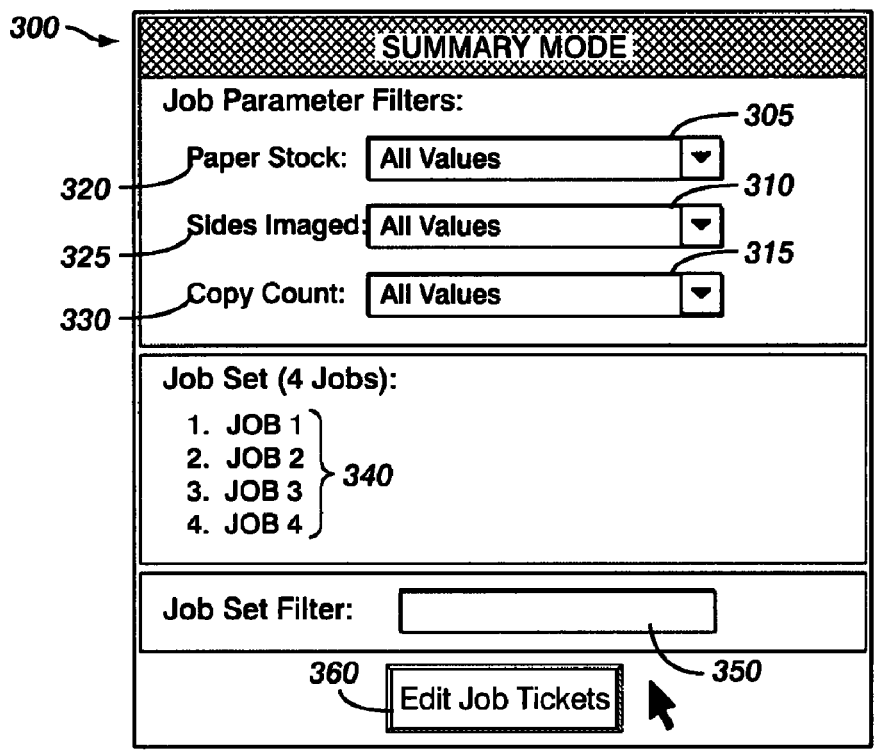
FIG. 3 illustrates a user interface depicting the job ticket parameters and values associated with user selected jobs, in accordance with a preferred embodiment.

When jobs are selected for Print Submission, each of these jobs has an associated job ticket (e.g., selection of Job 1, Job 2, Job 3, Job 4). Job tickets can be reviewed and edited utilizing the features of the present invention. FIG. 3 illustrates a screen shot of a user interface 300 depicting the job ticket parameters and values that can be associated with user selected jobs, in accordance with a preferred embodiment. Job ticket parameters and corresponding values for user selected jobs can be reviewed in an interactive mode that is referred to in the user interface 300 as "Summary Mode". Some of the job ticket parameters that can be displayed are paper stock 320, side images 325, and copy count 330, together with their corresponding values 305, 310, 315. The interactive mode can be used by a user to review job parameters in all selected jobs and to select a subset of the jobs for job ticket editing using drop down menus 305, 310, 315. For example, in this interactive mode a user is enabled to review a subset the selected jobs and to review the subset's job parameters by reviewing the corresponding value 310 for the "sides imaged" 325 parameter, where a drop down menu or additional screen shot will be rendered which would reveal how many jobs are in Simplex, Duplex or Head to Toe mode. For example, if one job is set in Simplex mode and three are set for Duplex mode, a screen shot can appear revealing the current mode in bold as follows:

| All Values |
| --- |
| Simplex (1) |
| Duplex (3) |
| Head To Toe (0) |

Interactive mode further enables a user to review the job parameters used in any selected job 1-4, as shown in the Job Set section 340 of the user interface 300. A user can enter into an Edit Job Tickets mode by selecting the soft button 360 on the user interface 300.

Three distinct filtering options can be used alone or in combination as filtering options provided by the Job parameter filters. They are: Option A—By selecting specific values for job parameters (e.g. selecting simplex will reduce the job set to 1); Option B—By selecting jobs from the job set (e.g. selecting jobs 1 and 3 will update the job parameters section above to reflect the summary of the job parameters for those two jobs; Option C—By filtering the job names from the set. These steps can be combined without restrictions.

As additional consideration, in the interactive mode (Summary Mode) it can be possible that the user will also have an option to reset all filters so the initial job set is displayed (not shown). Also, the job set listing could contain all types of job data such as creation dates, job type or any other information typically displayed in a file system browser. The job set filter will apply to all displayed data. When a query is initiated by entering data into a query field 350, the system can display the option to select the fields to be used by the filter (not shown).

Figure 4:
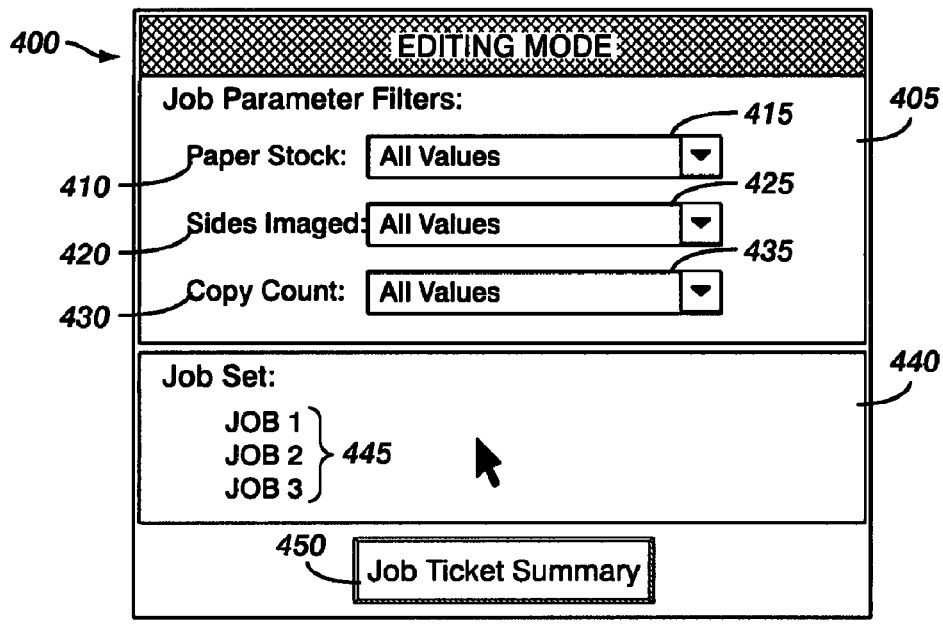
FIG. 4 illustrates a user interface depicting filtering of user selected jobs according to job ticket parameters and values selected by the user, in accordance with a preferred embodiment.

Referring to FIG. 4, an "Editing Mode" shown in a screen shot of user interface 400 enables a user to review the job parameters using job parameter filters 405, having corresponding job parameters 410, 420, 430, and values 415, 525, 535 (as discussed with respect to Option A above) with three differences, "All Values" is replaced with "Original Values", making a selection changes the values of all the job tickets associated with all jobs in the job set and the job set listing is read-only. A user can return to "Job Ticket Summary" mode by selecting soft button 450 as shown in the user interface 400.

Once all job tickets are defined, the user can submit the job to print using typical user interface soft button approvals known in the art. Optionally, the user may also make a selection (Job Ticket Details) which will display FIG. 5. The user can make this selection from either Summary or "Editing Mode." The user can review and change values for individual job tickets from the UI shown in FIG. 5 (not shown).

Figure 5:
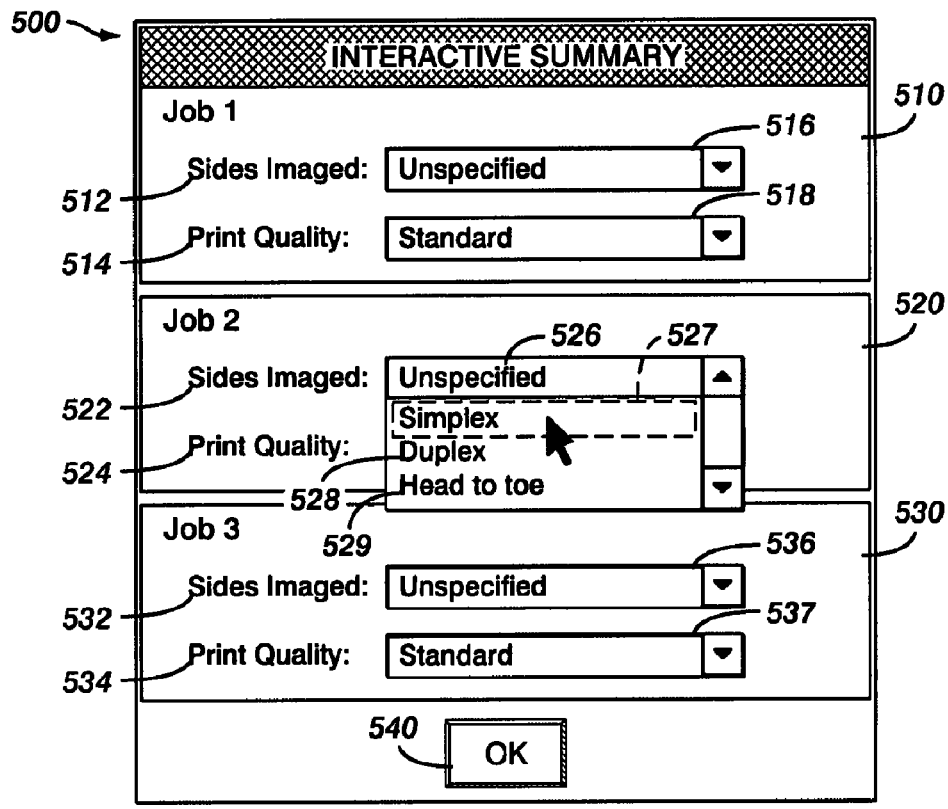
FIG. 5 illustrates a user interface depicting an "interactive summary" screen wherefrom a user can review and change values for individual job.

FIG. 5 illustrates a user interface 500 depicting the "Interactive Summary" displayed according to the job parameters selected by the user, in accordance with another feature of the invention, wherein once the user selects the desired job parameters, this screen shot 500 presents a more detailed interactive listing view for each of the jobs and the values for the specified parameters. For example, Side imaged 512 for Job 1 shown in window 510 has a corresponding value listed in as corresponding drop down menu 516. Print Quality 514 for Job 1 show a "Stadard" value in drop down menu 518. Job 2 lists "Sides Imaged" 522 as "Unspecified" 526, while underneath it a phantom window shows an optional selecton, "Simplex". Also for Job 2 shown in window 520, "Print Quality" 524 shows "Duplex" 528 and "Head to two" 529 as value options. Job 3 parameters and values are shown in window 530. Once parameter values are selected, the user can finalize the selection by pressing the "OK" button 540.

Figure 6:
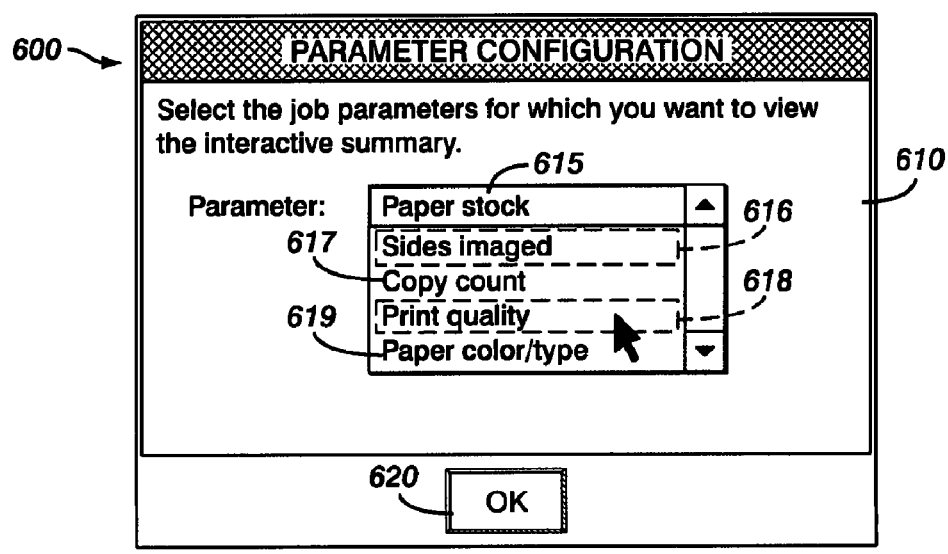
FIG. 6 illustrates a user interface depicting a "parameter interface" as a general configuration screen which enables the user to define which subset of job ticket parameters to use when using this invention.

FIG. 6 illustrates a general configuration screen which can be used to enable a user to define which subset of job ticket parameters to use when using this invention. The selected parameters can be used in all three modes illustrated in FIGS. 3-5 modes. A user interface 600 is provided for selecting the job parameters for which the user wants to view the interactive summary, in accordance with a preferred embodiment. In addition to the previous operation mode, the user also has the option to bring up an interactive summary view of the selected jobs. Within the view, the system 200 can prompt the user to select the job parameters from a drop down menu window 610, such as paper stock 615, side images 616, copy count 617, print quality 618 and paper color or type 619 for viewing the interactive summary. The user can select the job ticket parameters for example sides imaged 615 and print quality 618 as shown in the FIG. 6, and then finalize the selection of parameters by selecting the "OK" button 620 to view the interactive summary for the selected job parameters.

A substantial benefit of the invention is it prevents a user from having to look at information for each job individually (except on an exception basis), which is a limitation currently found in the art. A popup menu displayed in Sides Imaged can reflect the status of 65 different jobs (10+25+30). A user should not have a listing of jobs with discreet job ticketing information unless explicitly requested by the user. The main interface should ideally be an aggregated view in which the job parameters are shown and the number of jobs that specify each discreet value are listed. The one display of job parameters shows the aggregate values for the collection of jobs. When the user makes a job parameter selection, the system subsets the represented jobs to the jobs that use that job parameter value. The display, however, remains a job set aggregation and should not display individual job ticketing unless the user explicitly asks for this. Furthermore, the job list display can itself be in addition to the aggregation of job parameter values.

Within the detailed view, the user can also specify primary, secondary, tertiary, etc. sorting criteria. For example the user can very quickly determine whether all jobs going to iGen3 are printing duplex or not. The user has the option to change the value of any parameter within the interactive summary listing of selected job properties.

Figure 7:
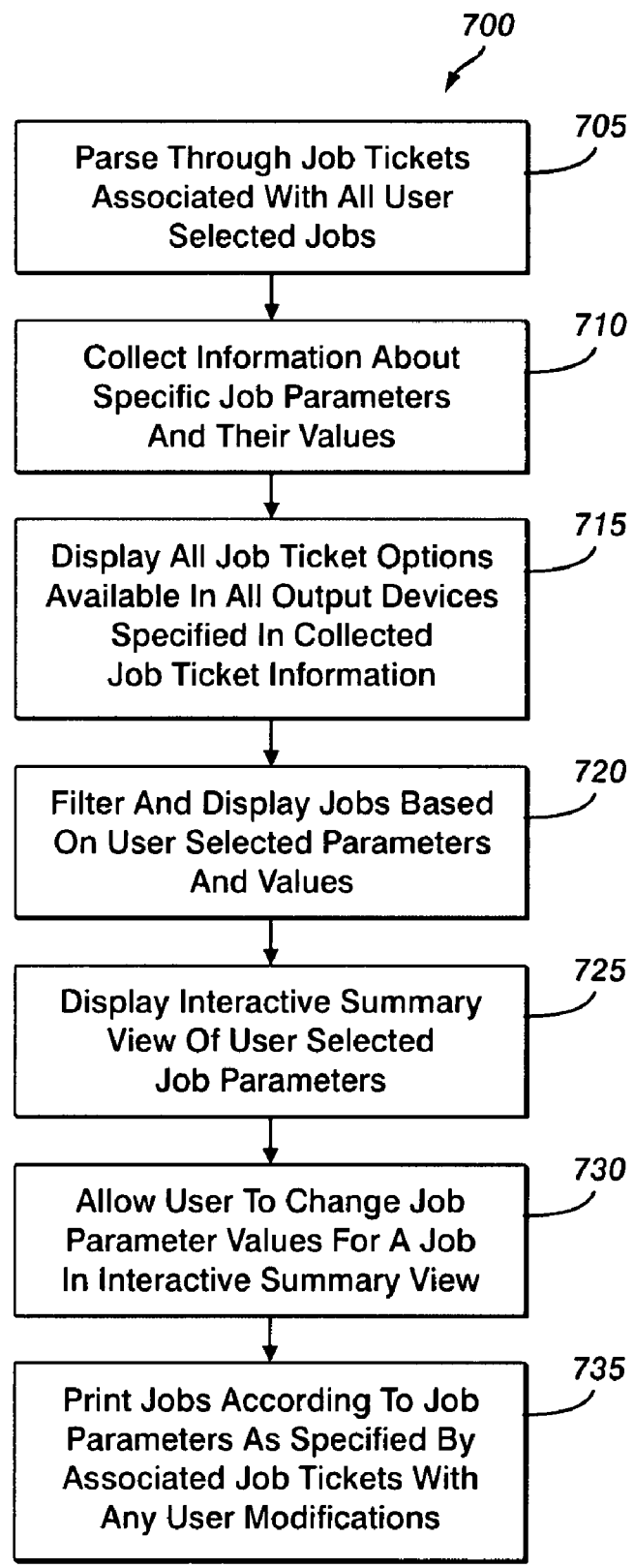
FIG. 7 illustrates a high level flow chart depicting the process of enhancing Job Ticket handling during multiple job submission, in accordance with a preferred embodiment.

FIG. 7 illustrates a high level flow chart 700 depicting the process of enhancing Job Ticket (JT) handling during multiple job submission, in accordance with a preferred embodiment. The system 200 parses through job tickets associated with all user selected jobs as depicted at block 705. Then as said at block 710, information about specific job parameters and their values can be collected. As described at block 715, all job ticket options available in all output devices specified in collected job ticket information are displayed. Then, the jobs based on user selected parameters and values can be filtered and displayed as depicted at block 720. An interactive summary view of user selected job parameters can be displayed as said at block 725. As indicated at block 730, user can change job parameter values for a job in interactive summary view. Finally, as said at block 735, jobs can be printed according to job parameter as specified by associated job tickets with any user modifications.

The method of handling submission of multiple jobs and their associated job tickets is less error prone and less tedious than current state. The user can drill down and focus only on the few parameters and the status of parameter can be determined at a glance without needing to review jobs one at a time. Furthermore, aggregation can enable the user to determine whether settings can be changed based on statistics of the collection of jobs for example if all but a handful of jobs are destined for the same print engine, the user may decide to better balance the load or may decide to just send everything to one print engine to simplify production. Using the interactive summary view, the operator can easily manage the critical-few job parameters that the operator are likely to care about when reprinting a collection of jobs with disparate job ticketing.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for enhancing job Ticket processing during job submission to a data processing system, comprising:
   selecting a plurality of jobs for printing; engaging in an interactive mode of operation to parse through a plurality of job ticket parameters and respective job ticket parameter values associated with a plurality of print engine models specified in a plurality of job tickets associated with e the plurality of user selected jobs;
   enabling review of information indicative of said plurality of job ticket parameters and said respective plurality of job ticket parameter values while engaged in said interactive mode of operation, wherein all collected job ticket information thereof is displayable and changeable in a single view;
   engaging in an aggregational operation mode for displaying the aggregate values for said plurality of user selected jobs;
   engaging in an editing mode, said editing mode enabling filtering and displaying user selected jobs based on user parameters and values selected within said editing mode; and
   enabling printing of said user selected jobs from said interactive mode and said editing mode
   changing a plurality of job parameter values for said plurality of user selected jobs in an interactive summary view; and
   rendering a plurality of drop down menus each of said drop down menus providing a modifiable value for one of said plurality of job ticket parameters,
   wherein said interactive summary view is displayed by prompting the user to select at least one said plurality of job parameters.

2. The method of claim 1 further comprising printing said plurality of user selected jobs according to changes to said plurality of job parameter values in said interactive summary view.

3. The method of claim 1 further comprising submitting said plurality of user-selected jobs for processing according to said changes.

4. The method of claim 3 wherein said plurality of user-selected jobs are submitted to an automated prepress system for processing according to said changes.

5. The method of claim 3 wherein said plurality of user-selected jobs are submitted to a Digital Front End (DFE) for processing according to said changes and said user-selected jobs are all queued to print before the first of said plurality of user selected jobs is released.

6. A method for enhancing Job Ticket processing, comprising:
   selecting a plurality of jobs for printing;
   engaging in an interactive mode of operation to parse through a plurality of job ticket parameters and respective job ticket parameter values associated with a plurality of print engine models specified in a plurality of job tickets associated with the plurality of user selected jobs;
   enabling review of information indicative of said plurality of job ticket parameters and said respective plurality of job ticket parameter values while engaged in said interactive mode of operation, wherein all the collected job ticket information thereof is displayable and changeable in a single view;
   engaging in an editing mode, said editing mode enabling filtering and displaying said user selected jobs based on user parameters and values selected within said editing mode;
   engaging in an aggregational operation mode for displaying the aggregate values for said plurality of user selected jobs,
   changing a plurality of job parameter values for said plurality of user selected jobs in an interactive summary view; and
   rendering a plurality of drop down menus each of said drop down menus providing a modifiable value for one of said plurality of job ticket parameters,
   wherein said interactive summary view is displayed by prompting the user to select at least one said plurality of job parameters.

7. The method of claim 6 further comprising enabling printing of said user selected jobs from said interactive mode and said editing mode.

8. The method of claim 6 further comprising printing said plurality of user selected, jobs according to changes to said plurality of job parameter values in said interactive summary view.

9. The method of claim 6 further comprising submitting said plurality of user-selected jobs for processing according to said changes.

10. The method of claim 9 wherein said plurality of user-selected jobs are submitted to a Digital Front End (DFE) for processing according to said changes and all said user-selected jobs are queued to print before the first of said plurality of user selected jobs is released.

11. The method of claim 9 wherein said plurality of user-selected jobs are submitted to an automated prepress system for processing according to said changes.

12. A computer implemented system for enhancing job ticket processing during multiple job submission, comprising: a data-processing apparatus; a job ticket module executed by said data-processing apparatus, said module and said data-processing apparatus being operable in combination with one another to:
   select a plurality of jobs for printing; parse through a plurality of job tickets and respective job ticket parameter values associated with a plurality of print engine models specified in a plurality of job tickets associated with e the plurality of user selected jobs;

collect information about a plurality of job parameters and their values;

display a plurality of job ticket options available in a plurality of output devices specified in collected job ticket information;

filter and displaying said plurality of user selected jobs based on a plurality of user selected parameters and values in a single view;

display an aggregational mode of the aggregate values for said plurality of user selected jobs;

display an interactive summary view for displaying and changing said e plurality job parameters for said plurality of job tickets associated with said plurality of user selected jobs selected by user change a plurality of job parameter values for said plurality of user selected jobs in an interactive summary view; and render a plurality of drop down menus each of said drop down menus providing a modifiable value for one of said plurality of job ticket parameters, wherein said interactive summary view is displayed by prompting the user to select at least one said plurality of job parameters.

13. The system of claim 12 wherein said module and said data-processing apparatus are operable in combination with one another to:

enable a user to change a plurality of job parameter values for a job in said interactive summary view; and enable a user to print said plurality of user selected jobs according to said plurality of job parameter as specified by associated job tickets with any user modifications in said interactive summary view.

* * * * *